US012467753B2

(12) United States Patent
Hsieh et al.

(10) Patent No.: US 12,467,753 B2
(45) Date of Patent: Nov. 11, 2025

(54) MULTI-LAYER DETACHABLE SINGLE-AXIS FIBER OPTIC SENSING DEVICE

(71) Applicant: AEGIVERSE CO., LTD, Taoyuan (TW)

(72) Inventors: Ching-Lu Hsieh, New Taipei (TW); Sheng-Han Chang, Taoyuan (TW); Bor-Wen Shiau, New Taipei (TW); Hung-Pin Chung, Kaohsiung (TW); Shih-Ju Fan, New Taipei (TW)

(*) Notice: Subject to any disclaimer, the term of this patent is extended or adjusted under 35 U.S.C. 154(b) by 0 days.

(21) Appl. No.: 18/988,955

(22) Filed: Dec. 20, 2024

(65) Prior Publication Data

US 2025/0198759 A1  Jun. 19, 2025

(30) Foreign Application Priority Data

Dec. 19, 2023 (TW) .................. 112149553

(51) Int. Cl.
*G01C 19/72* (2006.01)

(52) U.S. Cl.
CPC .................. *G01C 19/722* (2013.01)

(58) Field of Classification Search
CPC ..... G01C 19/72; G01C 19/721; G01C 19/722
See application file for complete search history.

(56) References Cited

U.S. PATENT DOCUMENTS

| 5,444,534 A | * | 8/1995 | Dyott | G01C 19/722 356/465 |
| 5,481,358 A | | 1/1996 | Dyott et al. | |
| 5,552,887 A | * | 9/1996 | Dyott | G01C 19/722 356/465 |
| 6,038,025 A | * | 3/2000 | Weed | G01C 19/722 356/460 |
| 8,773,665 B1 | * | 7/2014 | Logan, Jr. | G01C 19/72 356/460 |

FOREIGN PATENT DOCUMENTS

| CN | 105300372 A | | 2/2016 | |
| CN | 108931239 B | | 12/2018 | |
| CN | 110849361 A | * | 2/2020 | ........... G01C 19/722 |
| CN | 112304300 A | | 2/2021 | |

* cited by examiner

Primary Examiner — Michael A Lyons
(74) Attorney, Agent, or Firm — OPES IP Consulting Co., Ltd.

(57) ABSTRACT

A multi-layer detachable single-axis fiber optic sensing device is provided. The device includes a first circuit board, a light source module, an optical carrier, a beam guiding module, a modulation module, a fiber coil, a second circuit board, a detection module, a third circuit board, a transceiver module, a fourth circuit board, a power supply module, a fifth circuit board, and a computing module. The first circuit board, the optical carrier, the second circuit board, the third circuit board, the fourth circuit board, and the fifth circuit board may be arranged in any order, and any two adjacent ones can be detachably assembled together.

12 Claims, 4 Drawing Sheets

MULTI-LAYER DETACHABLE SINGLE-AXIS FIBER OPTIC SENSING DEVICE

CROSS-REFERENCE TO RELATED APPLICATIONS

This application claims priority of Taiwan Patent Application No. 112149553, filed on Dec. 19, 2023, the entirety of which is incorporated by reference herein.

FIELD OF THE INVENTION

The present invention relates to fiber optic sensing device, and in particular to a multi-layer detachable single-axis fiber optic sensing device.

BACKGROUND OF THE INVENTION

A fiber optic gyroscope is a sensing device that uses fiber optic sensing technology to measure spatial inertial rotation rates. Depending on the number of axes detected by the fiber optic gyroscopes, fiber optic gyroscopes are classified into single-axis gyroscopes and multi-axis gyroscopes. For example, a single-axis fiber optic gyroscope includes a light source module, a beam guiding module, a modulation module, a fiber coil, a detection module, a transceiver module, a power supply module, and a computing module.

The power supply module provides the required electrical power. The light source module generates a driving beam. The beam guiding module connects to the light source module, and receives and splits the driving beam. The modulation module connects to the beam guiding module and is used for modulating a driving phase of the driving beam, and splitting or combining the driving beam that is received. The fiber coil connects to the modulation module and used for transmitting the driving beam. The detection module connects to the beam guiding module and receives the returned driving beam after the driving beam has traveled through the fiber coil and back to the modulation module. Afterwards, the detection module transmits a detection signal according to the driving beam that is received. The transceiver module is electrically connected to the modulation module and the detection module and used for transmitting and receiving the driving beam and the detection signal. The computing module is electrically connected to the transceiver module and used for processing and analyzing the driving beam and detection signal to generate computing information. Therefore, the single-axis fiber optic gyroscope can detect and compute attitude and rotation speed.

During the assembly process of the single-axis fiber optic gyroscope, curing units (such as curing adhesives, UV adhesives, solder, etc.) are often used to affix and assemble the aforementioned elements and modules inside a case. In some situations, these elements and modules are cured together with the case. However, curing these elements and modules together means that if any element or module becomes damaged, the entire single-axis fiber optic gyroscope cannot function and cannot be repaired or replaced individually. It must be discarded entirely and reproduced or a new one must be purchased. Since the cost and the price of the single-axis fiber optic gyroscope is expensive, it increases costs for manufacturers or users. Therefore, there are improvement spaces for prior arts.

SUMMARY OF THE INVENTION

A multi-layer detachable single-axis fiber sensing device includes a first circuit board, a light source module, an optical carrier, a beam guiding module, a modulation module, a fiber coil, a second circuit board, a detection module, a third circuit board, a transceiver module, a fourth circuit board, a power supply module, a fifth circuit board, and a computing module. The light source module is disposed on the first circuit board, and used for generating a driving beam. The beam guiding module id disposed on the optical carrier, and used for receiving the driving beam and splitting the driving beam. The modulation module is disposed on the optical carrier and used for modulating a driving phase of the driving beam and splitting or combining the driving beam that is received. The fiber coil is disposed on the optical carrier and connected to the modulation module, and used for providing a transmission path for the driving beam. The detection module is disposed on the second circuit board and connected to the beam guiding module, and used for receiving the driving beam and outputting a detection signal accordingly. The transceiver module is disposed on the third circuit board and electrically connected to the modulation module and the detection module, and used for transmitting and receiving the driving beam and the detection signal. The power supply module is disposed on the fourth circuit board, and used for providing electrical power to the first circuit board, the second circuit board, the modulation module, the third circuit board, and the fourth circuit board. The computing module is disposed on the fifth circuit board and electrically connected to the transceiver module, and used for processing and analyzing the driving beam and the detection signal and generating computing information. The first circuit board, the optical carrier, the second circuit board, the third circuit board, the fourth circuit board, and the fifth circuit board are arranged in any order, and any two adjacent of them are detachably assembled to each other.

In some embodiments, the optical carrier is plate-shaped and includes a first bearing region and a second bearing region adjacent to each other, the modulation module and the beam guiding module are disposed in the first bearing region, and the fiber coil is disposed in the second bearing region and adjacent to the beam guiding module.

In some embodiments, the optical carrier has a receiving recess in the first bearing region and an annular recess in the second bearing region, the beam guiding module is disposed in the receiving recess, and the fiber coil is disposed in the annular recess.

In some embodiments, the optical carrier further includes at least one baffle, and the at least one baffle extends upwardly from a bottom of the optical carrier.

In some embodiments, the optical carrier has an outer annular recess to form a central bearing portion and an outer annular wall, the fiber coil is disposed in the outer annular recess, and the beam guiding module and the modulation module are disposed on the central bearing portion.

In some embodiments, the multi-layer detachable single-axis fiber optic sensing device further includes a case, wherein the case includes a case body and a base plate, the case body is detachably assembled to the base plate to accommodate the optical carrier, the first circuit board, the second circuit board, the third circuit board, the fourth circuit board, and the fifth circuit board.

In some embodiments, the optical carrier is detachably assembled to the first circuit board, the second circuit board and the third circuit board are detachably assembled to the first circuit board with the optical carrier disposed on an opposite side of the first circuit board, the fourth circuit board is detachably assembled to the second circuit board and the third circuit board with the first circuit board disposed on an opposite side of the second circuit board and an opposite side of the third circuit board, and the fifth circuit board is detachably assembled to the fourth circuit board with the second circuit board and the third circuit board disposed on an opposite side of the fourth circuit board.

In some embodiments, the second circuit board and the third circuit board are disposed adjacent to each other.

In some embodiments, the area of the second circuit board is substantially equal to the area of the third circuit board.

In some embodiments, projections of the optical carrier, the first circuit board, the second circuit board, the third circuit board, and the fourth circuit board along a normal of the fifth circuit board onto the fifth circuit board are completely overlap with the fifth circuit board.

In some embodiments, the first circuit board, the optical carrier, the second circuit board, the third circuit board, the fourth circuit board, and the fifth circuit board are arranged in any order, and any two adjacent of them are detachably assembled to each other using at least one of a plurality of fasteners and a plurality of electrical connectors.

In some embodiments, a normal of the first circuit board, a normal of the second circuit board, a normal of the third circuit board, a normal of the fourth circuit board, and a normal of the fifth circuit board are substantially parallel to each other.

BRIEF DESCRIPTION OF DRAWINGS

Aspects of the present disclosure are best understood from the following detailed description when read with the accompanying figures. It should be noted that, in accordance with the standard practice in the industry, various features are not drawn to scale. In fact, the dimensions of the various features may be arbitrarily increased or reduced for clarity of discussion.

DETAILED DESCRIPTION OF THE INVENTION

Figure 1:
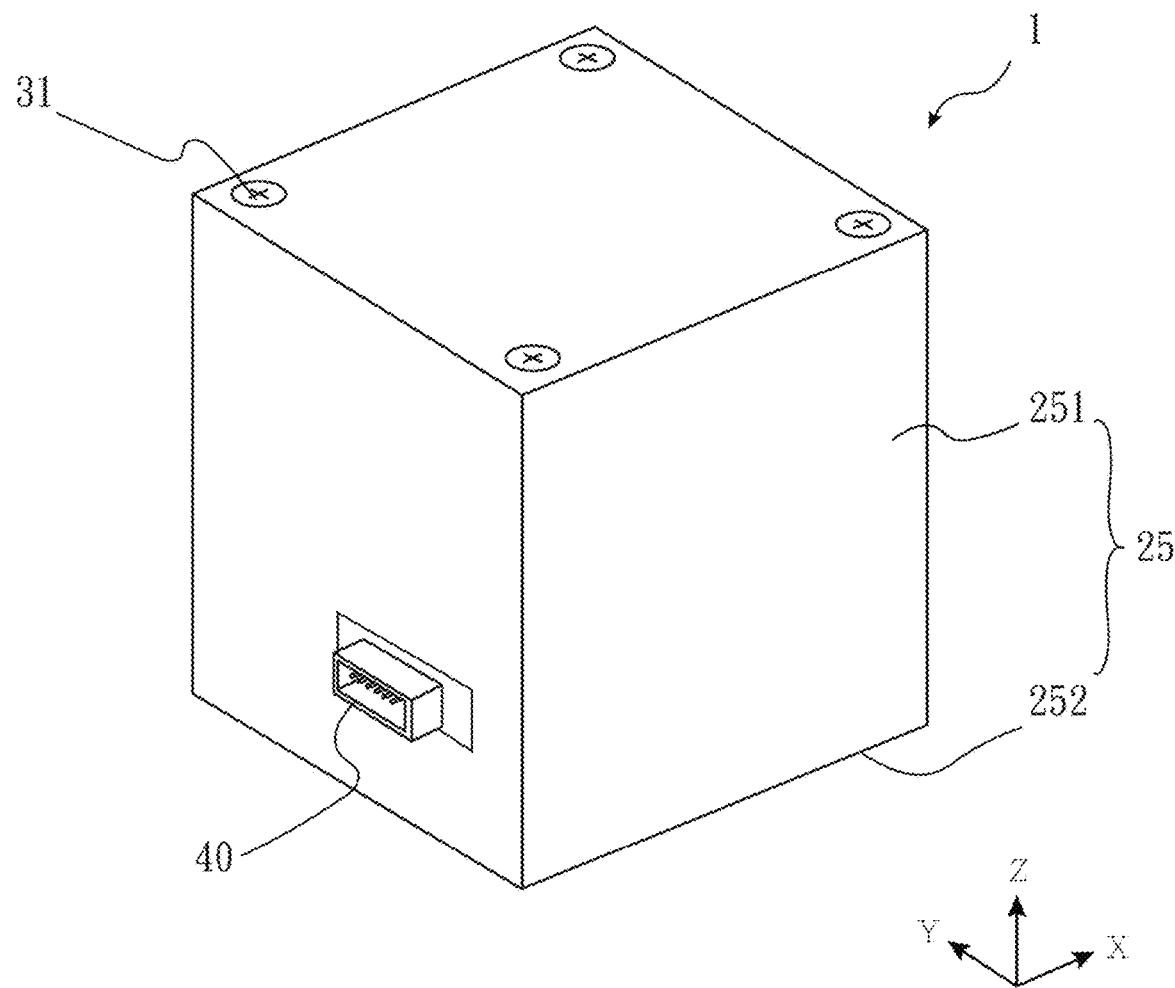
FIG. 1 is a schematic view of a multi-layer detachable single-axis fiber optic sensing device in some embodiments of the present disclosure.

The following disclosure provides many different embodiments, or examples, for implementing different features of the provided subject matter. Specific examples of elements and arrangements are described below to simplify the present disclosure. These are, of course, merely examples and are not intended to be limiting. For example, the formation of a first feature over or on a second feature in the description that follows may include embodiments in which the first and second features are in direct contact, and may also include embodiments in which additional features may be disposed between the first and second features, such that the first and second features may not be in direct contact.

In addition, the present disclosure may repeat reference numerals and/or letters in the various examples. This repetition is for the purpose of simplicity and clarity and does not in itself dictate a relationship between the various embodiments and/or configurations discussed. Moreover, the formation of a feature on, connected to, and/or coupled to another feature in the present disclosure that follows may include embodiments in which the features are in direct contact, and may also include embodiments in which additional features may be disposed interposing the features, such that the features may not be in direct contact. In addition, spatially relative terms, for example, "vertical," "above," "over," "below,", "bottom," etc. as well as derivatives thereof (e.g., "downwardly," "upwardly," etc.) are used in the present disclosure for ease of description of one feature's relationship to another feature. The spatially relative terms are intended to cover different orientations of the device, including the features.

The terms "about" and "substantially" typically mean +/−20% of the stated value, more typically +/−10% of the stated value, more typically +/−5% of the stated value, more typically +/−3% of the stated value, more typically +/−2% of the stated value, more typically +/−1% of the stated value and even more typically +/−0.5% of the stated value. The stated value of the present disclosure is an approximate value. When there is no specific description, the stated value includes the meaning of "about" or "substantially".

Figure 2:
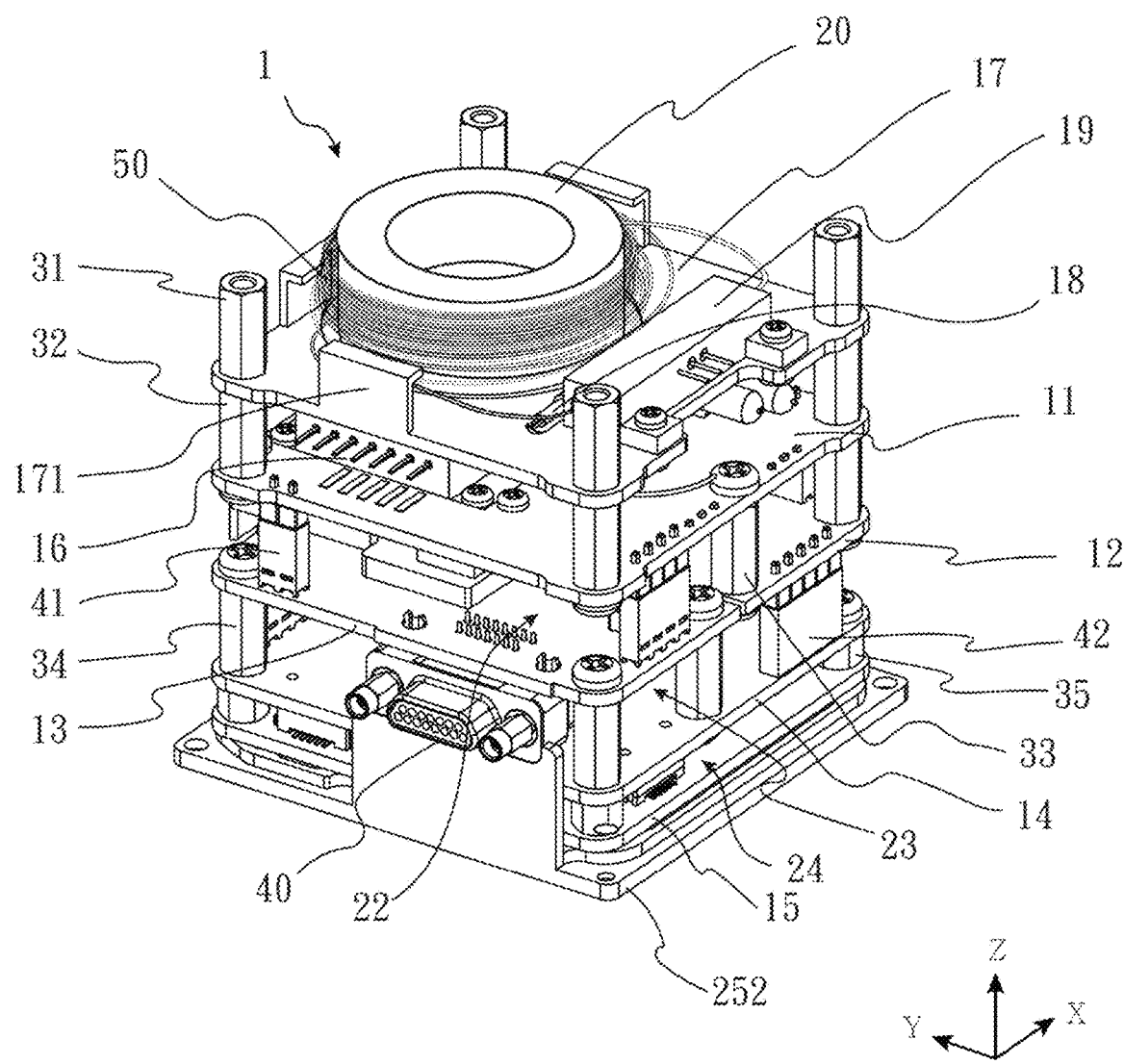
FIG. 2 is a schematic view of some elements of the multi-layer detachable single-axis fiber optic sensing device.
Figure 3:
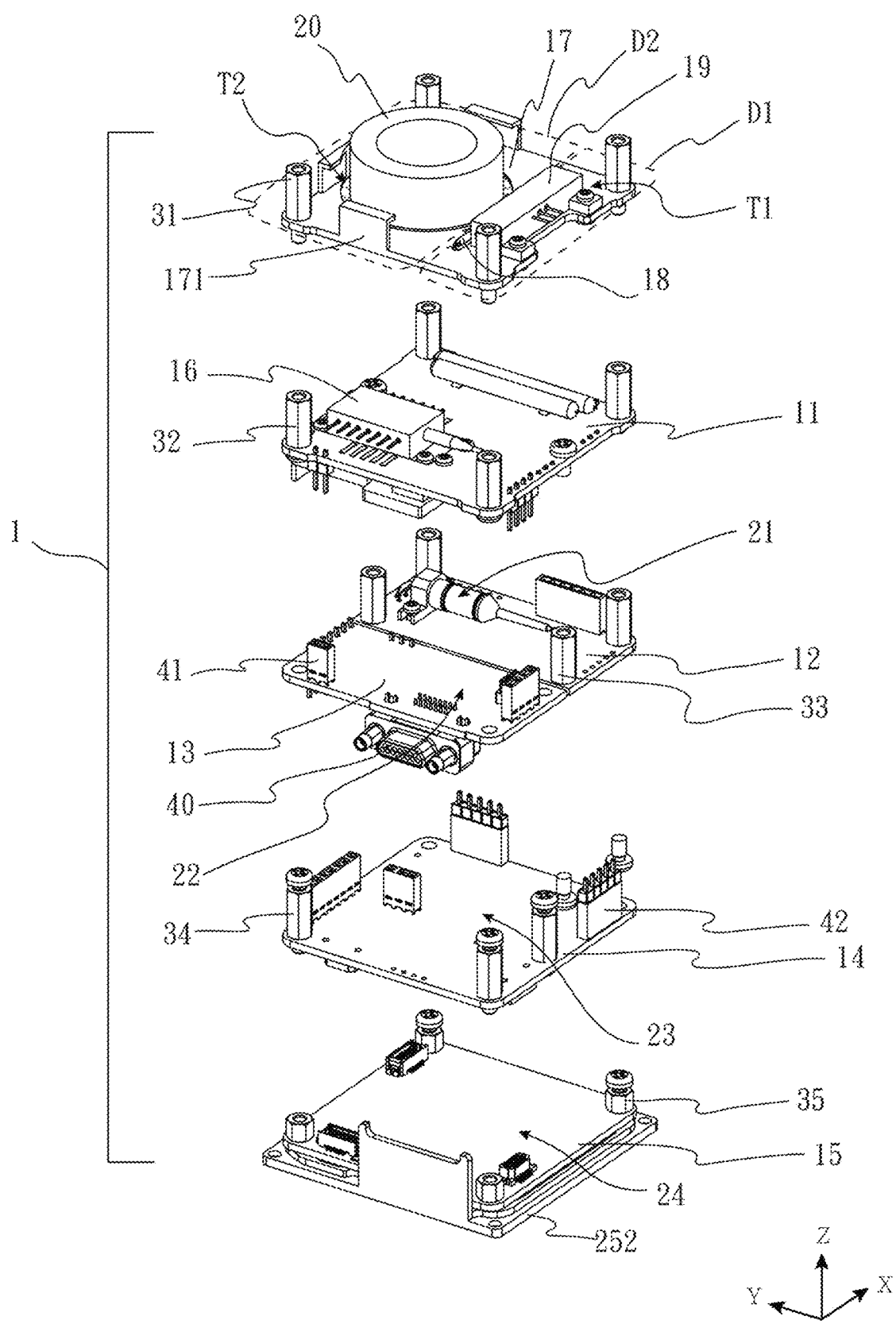
FIG. 3 is an exploded view of the multi-layer detachable single-axis fiber optic sensing device.

Embodiments of the present disclosure provides a multi-layer detachable single-axis fiber optic sensing device 1. For example, FIG. 1 is a schematic view of a multi-layer detachable single-axis fiber optic sensing device 1 in some embodiments of the present disclosure. FIG. 2 is a schematic view of some elements of the multi-layer detachable single-axis fiber optic sensing device 1, wherein a case body 251 is omitted to show other elements. FIG. 3 is an exploded view of the multi-layer detachable single-axis fiber optic sensing device 1. Referring to FIGS. 1 to 3, the multi-layer detachable single-axis fiber optic sensing device 1 includes a first circuit board 11, a second circuit board 12, a third circuit board 13, a fourth circuit board 14, a fifth circuit board 15, a light source module 16, an optical carrier 17, a beam guiding module 18, a modulation module 19, a fiber coil 20, a detection module 21, a transceiver module 22, a power supply module 23, and a computing module 24. In this embodiment, the multi-layer detachable single-axis fiber optic sensing device 1 further includes a case 25 having a case body 251 and a base plate 252.

In some embodiments, the light source module 16 may be disposed on the first circuit board 11 to generate a driving beam. The light source module 16 may be a light-emitting diode (LED), a solid-state laser, a semiconductor laser, or another type of light source that can provide a beam meeting the requirements of the multi-layer detachable single-axis fiber optic sensing device 1, but it is not limited thereto. Generally, the requirements include: wavelength, bandwidth, coherence, or other optical characteristics.

In some embodiments, the beam guiding module 18, the modulation module 19, and the fiber coil 20 are disposed on the optical carrier 17. The beam guiding module 18 is connected to the light source module 16 and used for receiving the driving beam. The beam guiding module 18 may be a wavelength division multiplexer, a circulator, a coupler, an isolator, or another module with beam-guiding functionality. The modulation module 19 is connected to the beam guiding module 18 to modulate a driving phase of the driving beam and to split or combine the driving beam. The modulation module 19 may be an integrated optical chip, a multi-functional integrated optical chip, or another unit or module with modulation functionality. Both ends of the fiber coil 20 are connected to the modulation module 19 for transmitting the driving beam. In short, when the driving beam passes from the beam guiding module 18 through the modulation module 19 to the fiber coil 20, the modulation module 19 splits the driving beam. When the split driving beam returns from the fiber coil 20 through the modulation module 19 to the beam guiding module 18, the modulation module 19 combines the split beams. Additionally, the optical fiber 50 may be wound around the fiber coil 20 to allow the driving beam to be transmitted through the optical fiber 50.

In some embodiments, the detection module 21 may be disposed on the second circuit board 12 and connected to the beam guiding module 18 relative to the light source module 16 and the modulation module 19. The detection module 21 is used to receive the driving beam and transmit a detection signal accordingly. In short, the transmission path of the driving beam may sequentially pass through the light source module 16, the beam guiding module 18, the modulation module 19, the fiber coil 20, the modulation module 19, the beam guiding module 18, and the detection module 21. The detection module 21 may be a photodiode, a photodetector, or another element or module with detection functionality. In practice, optical elements like the light source module 16, the beam guiding module 18, the modulation module 19, the fiber coil 20, and the detection module 21 are connected by the optical fiber 50, as shown in FIG. 2. The optical fiber connection not only provides basic connection strength but also transmits the driving beam. It should be noted that in order to avoid too many lines from confusing the technical features of this embodiment, FIG. 2 only illustrates the optical fiber 50 at the topmost layer. A person having ordinary skill in the art can easily understand how two optical elements are connected by the optical fiber 50.

In some embodiments, the transceiver module 22 may be disposed on the third circuit board 13 and electrically connected to the modulation module 19 and the detection module 21 to transmit and receive detection signals. The transceiver module 22 may be a transceiver, a controller, a microcontroller unit (MCU), an application-specific integrated circuit (ASIC), or another module with transceiver functionality.

In some embodiments, the power supply module 23 may be disposed on the fourth circuit board 14 to provide electrical power to the first circuit board 11, the second circuit board 12, the modulation module 19, the third circuit board 13, the fourth circuit board 14, and the fifth circuit board 15. The power supply module 23 may include energy storage devices, power management circuits, controllers, transistors, inductors, or resistors.

In some embodiments, the computing module 24 may be disposed on the fifth circuit board 15 and electrically connected to the transceiver module 22. The computing module 24 is used to process and analyze the driving beam and detection signals to generate computation information accordingly. The computing module 24 may be a processor, a computing unit, a microcontroller, a field-programmable gate array (FPGA), a digital signal processor (DSP), an application-specific integrated circuit (ASIC), or another circuit, unit, or module with computation functionality.

In some embodiments, the multi-layer detachable single-axis fiber optic sensing device 1 further includes an interface 40. The interface 40 is exposed from the case body 251 to allow the multi-layer detachable single-axis fiber optic sensing device 1 to communicate with external devices. For example, the interface 40 may be used to electrically connect external devices to the third circuit board 13, and then electrically connected to other elements within the multi-layer detachable single-axis fiber optic sensing device 1 through the third circuit board 13 to control the multi-layer detachable single-axis fiber optic sensing device 1. The interface 40 may be a Micro-D connector, a D-subminiature (D-sub) connector, bare wires, or another element or module with electrical connection functionality.

The first circuit board 11, the second circuit board 12, the third circuit board 13, the fourth circuit board 14, the fifth circuit board 15, and the optical carrier 17 may be arranged in any order, and any two adjacent elements are detachably assembled to each other. Since any two adjacent elements may be detachably assembled, when the first circuit board 11, the second circuit board 12, the third circuit board 13, the fourth circuit board 14, the fifth circuit board 15, and the optical carrier 17, or the light source module 16, the beam guiding module 18, the modulation module 19, the fiber coil 20, the detection module 21, the transceiver module 22, the power supply module 23, or the computing module 24 disposed thereon is damaged, only the damaged element needs to be replaced. For example, only a specific circuit board is replaced to repair or replace a damaged element without discarding the entire multi-layer detachable single-axis fiber optic sensing device 1, so the cost and the repair difficulty are reduced. For example, if the total cost of the entire multi-layer detachable single-axis fiber optic sensing device 1 is evenly distributed across the elements and modules on the optical carrier 17, the first circuit board 11, the second circuit board 12, the third circuit board 13, the fourth circuit board 14, and the fifth circuit board 15, the detachable design of the present invention can only replace a single-layer circuit board, which saves up to 83.33% of the cost when compared to the prior art that requires replacing the entire device. Moreover, the total cost is not evenly distributed across all elements in practice, so it is possible so save more cost by the present invention. Additionally, the case body 251 and the base plate 252 of the case 25 are also detachably connected to other elements. As a result, when they need to be repaired, the case 25 may be easily removed to easily repair the multi-layer detachable single-axis fiber optic sensing device 1.

In this embodiment, the optical carrier 17, the first circuit board 11, the second circuit board 12, the third circuit board 13, the fourth circuit board 14, and the fifth circuit board 15 are parallel to each other. In other words, their normals are parallel or substantially parallel to facilitate assembly.

As shown in FIGS. 2 and 3, in this embodiment, the elements of the multi-layer detachable single-axis fiber optic sensing device 1 are arranged from top to bottom in the order of the optical carrier 17, the first circuit board 11, the second circuit board 12, the third circuit board 13, the fourth circuit board 14, and the fifth circuit board 15, but it is not limited thereto. In other embodiments of the present invention, the arrangement from top to bottom may also be the fourth circuit board 14, the first circuit board 11, the optical carrier 17, the second circuit board 12, the third circuit board 13, and the fifth circuit board 15, or other arrangement combinations. This allows the positions of the circuit boards to be adjusted according to the design to increase design flexibility.

In other embodiments, the fourth circuit board 14 is detachably assembled to the first circuit board 11, the optical carrier 17 is detachably assembled to the first circuit board 11 with the fourth circuit board 14 disposed on an opposite of the first circuit board 11, and the second circuit board 12 and third circuit board 13 are detachably assembled to the optical carrier 17 with the first circuit board 11 disposed on an opposite side of the optical carrier 17. The fifth circuit board 15 is detachably assembled to the second circuit board 12 and the third circuit board 13 with the optical carrier 17 disposed on an opposite side of the second circuit board 12 and an opposite side of the third circuit board 13. In other words, in such embodiment, the fourth circuit board 14, the first circuit board 11, the optical carrier 17, the second circuit board 12, the third circuit board 13, and the fifth circuit board 15 may be sequentially arranged from top to bottom to increase design flexibility.

In this embodiment, as shown in FIG. 3, the optical carrier 17 is plate-shaped and has a first bearing region D1 and a second bearing region D2. The first bearing region D1 and the second bearing region D2 are adjacent to each other. The beam guiding module 18 and the modulation module 19 are disposed in the first bearing region D1. The fiber coil 20 is disposed in the second bearing region D2 and is adjacent to the beam guiding module 18. In some embodiments, the first bearing region D1 has a receiving recess T1 for disposing the beam guiding module 18. The second bearing region D2 has an annular recess T2 for disposing the fiber coil 20. Therefore, the positions of the beam guiding module 18 and the fiber coil 20 may be affixed to prevent interference with the optical path and improve the production stability of the multi-layer detachable single-axis fiber optic sensing device 1. As a result, the beam guiding module 18 and the fiber coil 20 of different multi-layer detachable single-axis fiber optic sensing devices 1 may be positioned at the same position. Additionally, the receiving recess T1 and the annular recess T2 may slightly limit the positions of the beam guiding module 18 and the fiber coil 20 to reduce the risk of damage to the beam guiding module 18 and the fiber coil 20 caused by unexpected movement or rolling before curing.

Preferably, the optical carrier 17 further includes at least one baffle 171. The baffle 171 is disposed on an edge of the optical carrier 17 to prevent the optical fiber 50 on the optical carrier 17 from protruding beyond the optical carrier 17, which prevents the optical fiber 50 from being broken by the case body 251 or other factors during assembly. The number of baffles 171 may be adjusted based on actual requirement. For example, in some embodiments, the optical carrier 17 may include three baffles 171 respectively positioned on three edges adjacent to the fiber coil 20. The baffle 171 may extend upwardly from the optical carrier 17 (such as in the +Z direction) and then extend inwardly to constrain the outward and upward movement of the optical fiber 50, so the risk of the optical fiber 50 from protruding outwardly and being broken may be further reduced. In some embodiments, a partition similar to the baffle 171 may be disposed between two fasteners 31 on the same side of the optical carrier 17. The partition is used to limit the outward and upward dimensions of the optical fiber 50. Specifically, a plate-like or sheet-like structure may be disposed between the two fasteners. For example, a plastic sheet or a plastic plate is affixed between the two fasteners. In other embodiments, the partition may be configured as a frame that encloses the periphery of the fasteners and is affixed to the fasteners, or the partition may be disposed on or placed on the optical carrier 17. Furthermore, the partition may be affixed to at least one of the fasteners or the optical carrier for structural stability.

In this embodiment, the second circuit board 12 is adjacent to the third circuit board 13. In some embodiments, the area of the second circuit board 12 is substantially equal to the area of the third circuit board 13. Furthermore, the area of the second circuit board 12 or the third circuit board 13 may be substantially half the area of the fifth circuit board 15. Therefore, the second circuit board 12 and the third circuit board 13 may be disposed adjacent to each other, and the combined area of the second circuit board 12 and the third circuit board 13 may be substantially equal to the area of other elements (such as the optical carrier 17, the first circuit board 11, the fourth circuit board 14, or the fifth circuit board 15). By reducing the areas of the second circuit board 12 and the third circuit board 13, the overall volume of the multi-layer detachable single-axis fiber optic sensing device 1 may be reduced, so the occupied space may be decreased to achieve miniaturization. As a result, the multi-layer detachable single-axis fiber optic sensing device 1 is suitable for applications in space-constrained fields, such as cube satellites, unmanned aerial vehicles, etc., but it is not limited thereto. In some embodiments, the second circuit board 12 and the third circuit board 13 may be disposed from top to bottom, such as at different coordinates in the Z direction or overlap each other, depending on the design requirements.

In this embodiment, when the optical carrier 17, the first circuit board 11, the second circuit board 12, the third circuit board 13, and the fourth circuit board 14 are projected along the normal of the fifth circuit board 15 onto the fifth circuit board 15, their projection are completely positioned on or within the fifth circuit board 15 rather than extending beyond the fifth circuit board 15. In other words, the area of the optical carrier 17, the first circuit board 11, the second circuit board 12, the third circuit board 13, or the fourth circuit board 14 may be less than or equal to the area of the fifth circuit board 15. Therefore, the space occupied by the multi-layer detachable single-axis fiber optic sensing device 1 of the present invention may be further reduced to achieve miniaturization.

In this embodiment, the sides of some circuit boards are shrink inwardly, which may also be treated as forming recesses to accommodate optical fibers or wires. For example, as shown in FIG. 2, the edge of the optical carrier 17 below the baffle 171 is shrink inwardly than the edge of the optical carrier 17 below the fastener 31, so the gap between the optical carrier 17 and the case body 251 becomes larger. Therefore, if an optical fiber 50 on the optical carrier 17 is connected to an optical element on the first circuit board 11 through the shrink edge of the optical carrier 17, the risk of the optical fiber 50 being broken during final assembly of the case body 251 may be reduced. Similarly, as shown in FIG. 2, the first circuit board 11 also has the same inwardly-shrink feature, which also achieves the same function.

It should be noted that to clearly illustrate the features of this embodiment, the optical fiber 50 shown in FIG. 2 is not shown in the exploded view in FIG. 3 to avoid too many lines from confusing or blocking the features of this embodiment. Additionally, examples of the transceiver module 22, the power supply module 23, and the computing module 24 have been described in detail in the previous paragraphs, so the drawings are merely schematic as well.

In some embodiments, the multi-layer detachable single-axis fiber optic sensing device 1 may further include at least one of a plurality of fasteners and a plurality of electrical connectors to enable other elements being detachably assembled to each other. For example, as shown in FIGS. 1 to 3, the multi-layer detachable single-axis fiber optic sensing device 1 may further include fasteners 31, 32, 33, 34, and 35, and electrical connectors 41 and 42. The fastener 31 may be used for connecting the optical carrier 17 and the case body 251. The fastener 32 may be used for connecting the first circuit board 11. The fastener 33 may be used for connecting the first circuit board 11 and the second circuit board 12. The fastener 34 may be used for connecting the third circuit board 13 and the fourth circuit board 14. The fastener 35 may be used for connecting the fourth circuit board 14, the fifth circuit board 15, and the base plate 252. In some embodiments, the fastener 31 may be exposed from the case body 251. Additionally, the electrical connector 41 may be electrically connected to the first circuit board 11 and the third circuit board 13, and the electrical connector 42 may be electrically connected to the second circuit board 12 and the fourth circuit board 14. It should be noted that not all the fasteners and electrical connectors are shown in FIGS. 1 to 3, and the multi-layer detachable single-axis fiber optic sensing device 1 may have additional fasteners and electrical connectors to physically and electrically connect other elements in the multi-layer detachable single-axis fiber optic sensing device 1.

Although the aforementioned embodiments show a plurality of fasteners and electrical connectors, the present disclosure is not limited thereto. It should be noted that as long as the operation of the multi-layer detachable single-axis fiber optic sensing device 1 is not affected, the multi-layer detachable single-axis fiber optic sensing device 1 may include any number of fasteners and electrical connectors. For example, all four edges of the fourth circuit board 14 may be filled with fasteners and electrical connectors to increase the connection strength between the fourth circuit board 14 and the second circuit board 12 and third circuit board 13.

Figure 4:
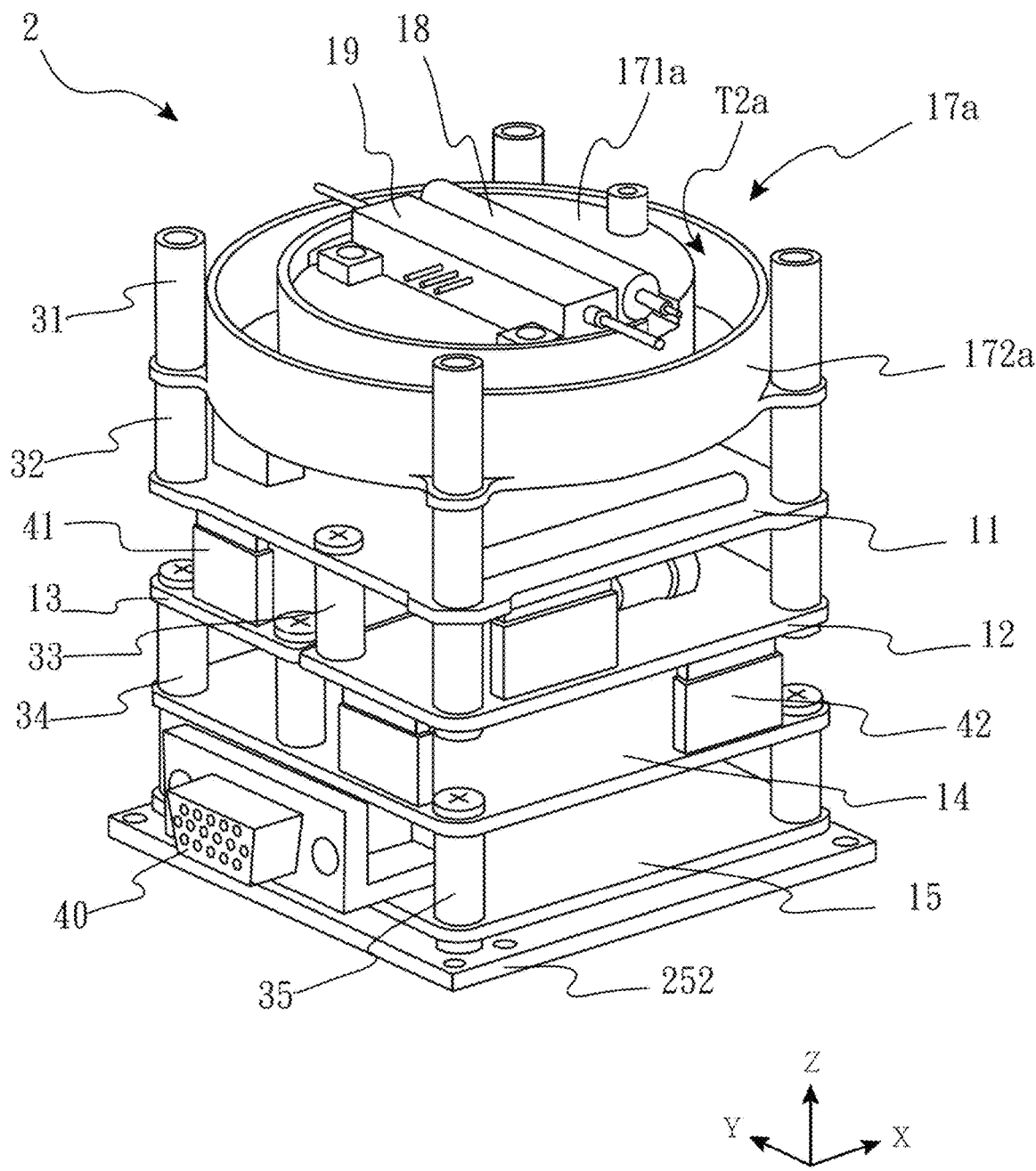
FIG. 4 is a schematic view of a multi-layer detachable single-axis fiber optic sensing device in other embodiments of the present disclosure.

FIG. 4 is a schematic view of a multi-layer detachable single-axis fiber optic sensing device 2 in other embodiments of the present disclosure, wherein the case body (such as the case body 251 in FIG. 1) is omitted to show other elements. As shown in FIG. 4, the difference between this embodiment and the previous embodiments is that the optical carrier 17 may be replaced with an optical carrier 17a. Similar elements to the previous embodiments are not described again.

In some embodiments, the optical carrier 17a has an outer annular recess T2a to form a central bearing portion 171a and an outer annular wall 172a. The fiber coil is disposed in the outer annular recess T2a, and the beam guiding module 18 and modulation module 19 are disposed on the central bearing portion 171a. Therefore, the positions of the elements may be further fixed, and signal interference between the elements may be avoided. The central bearing portion 171a and the outer annular wall 172a also have the same function as the baffle 171 in the aforementioned embodiments, which prevents the optical fiber from protruding beyond the optical carrier 17a to reduce the risk of the optical fiber being broken by the case body 251 or other factors during assembly. It should be noted that the fiber coil 20 and the optical fiber 50 in FIG. 2 are omitted from FIG. 4 to clearly disclose the features of the outer annular recess T2a. However, based on the previous embodiments and the details disclosed in FIG. 4, it should be easily understood how the fiber coil and the optical fiber are disposed in the outer annular recess T2a.

Additionally, in other embodiments, the outer annular wall 172a may have an inclined recess to allow the optical fiber (such as the optical fiber 50 shown in FIG. 2) on the optical carrier 17a to pass through and connect to an optical element on the first circuit board 11. The inclined recess not only increases the gap between the optical carrier 17a and the case body (such as the case body 251 in FIG. 1), thereby reducing the risk of breaking the optical fiber during final assembly of the case body, but also restricts and secures the optical fiber. Since the optical fibers are relatively fragile, the inclined recess limits and fixes the position of the optical fiber to prevent excessive vibration or shaking when the multi-layer detachable single-axis fiber optic sensing device experiences vibration or shaking. This design reduces the risk of fiber breakage. Furthermore, fixing the position of the optical fiber enhances process stability, increases product yield, and improves production repeatability.

In summary, the multi-layer detachable single-axis fiber optic sensing device provided by the present invention utilizes a first circuit board, an optical carrier, a second circuit board, a third circuit board, a fourth circuit board, and a fifth circuit board to form a multi-layer detachable structure. When compared to the prior art, the present invention allows only remove the corresponding circuit board or carrier for repairing or replacement when an element is broken, rather than discard the entire multi-layer detachable single-axis fiber optic sensing device to save costs. The first circuit board, the optical carrier, the second circuit board, the third circuit board, the fourth circuit board, and the fifth circuit board are substantially parallel to facilitate assembly. The optical carrier may also have a receiving recess and an annular recess to fix the positions of the beam guiding module and fiber coil to reduce the risk of element damage. Furthermore, interference with the optical path may be prevented, and production stability may be increased. The baffle of the optical carrier may effectively prevent the optical fiber from protruding beyond the optical carrier, which reduces the risk of optical fiber from broken. The invention may further include a plurality of fasteners and electrical connectors to enhance the connection strength and structural strength. Additionally, the multi-layer detachable structure may further reduce the size and occupied space. Therefore, it is suitable for applications in space-constrained fields. The position of the circuit boards may also be modified according to design requirements to increase design flexibility.

The detailed description of the preferred embodiments above is intended to more clearly describe the features and spirit of the present invention, rather than to limit the scope of the invention to the preferred embodiments disclosed. On the contrary, it is intended that the scope of the present invention encompasses various modifications and equivalent arrangements within the scope of the claims.

The invention claimed is:

1. A multi-layer detachable single-axis fiber optic sensing device, comprising:
 a first circuit board;
 a light source module disposed on the first circuit board and used for generating a driving beam;
 an optical carrier;
 a beam guiding module disposed on the optical carrier and used for receiving the driving beam and splitting the driving beam;
 a modulation module disposed on the optical carrier and used for modulating a driving phase of the driving beam and splitting or combining the driving beam that is received;
 a fiber coil disposed on the optical carrier, connected to the modulation module, and used for providing a transmission path for the driving beam;
 a second circuit board;
 a detection module disposed on the second circuit board, connected to the beam guiding module, and used for receiving the driving beam and outputting a detection signal accordingly;
 a third circuit board;
 a transceiver module disposed on the third circuit board, electrically connected to the modulation module and the detection module, and used for transmitting and receiving the driving beam and the detection signal;

a fourth circuit board;
a power supply module disposed on the fourth circuit board and used for providing electrical power to the first circuit board, the second circuit board, the modulation module, the third circuit board, and the fourth circuit board;
a fifth circuit board; and
a computing module disposed on the fifth circuit board, electrically connected to the transceiver module, and used for processing and analyzing the driving beam and the detection signal to generate computing information;
wherein the first circuit board, the optical carrier, the second circuit board, the third circuit board, the fourth circuit board, and the fifth circuit board are arranged in any order, and any two adjacent of them are detachably assembled to each other.

2. The multi-layer detachable single-axis fiber optic sensing device as claimed in claim 1, wherein the optical carrier is plate-shaped and comprises a first bearing region and a second bearing region adjacent to each other, the modulation module and the beam guiding module are disposed in the first bearing region, and the fiber coil is disposed in the second bearing region and adjacent to the beam guiding module.

3. The multi-layer detachable single-axis fiber optic sensing device as claimed in claim 2, wherein the optical carrier has a receiving recess in the first bearing region and an annular recess in the second bearing region, the beam guiding module is disposed in the receiving recess, and the fiber coil is disposed in the annular recess.

4. The multi-layer detachable single-axis fiber optic sensing device as claimed in claim 2, wherein the optical carrier further comprises at least one baffle, and the at least one baffle extends upwardly from a bottom of the optical carrier.

5. The multi-layer detachable single-axis fiber optic sensing device as claimed in claim 1, wherein the optical carrier has an outer annular recess to form a central bearing portion and an outer annular wall, the fiber coil is disposed in the outer annular recess, and the beam guiding module and the modulation module are disposed on the central bearing portion.

6. The multi-layer detachable single-axis fiber optic sensing device as claimed in claim 1, further comprising a case, wherein the case comprises a case body and a base plate, and the case body is detachably assembled to the base plate to accommodate the optical carrier, the first circuit board, the second circuit board, the third circuit board, the fourth circuit board, and the fifth circuit board.

7. The multi-layer detachable single-axis fiber optic sensing device as claimed in claim 1, wherein the optical carrier is detachably assembled to the first circuit board, the second circuit board and the third circuit board are detachably assembled to the first circuit board with the optical carrier disposed on an opposite side of the first circuit board, the fourth circuit board is detachably assembled to the second circuit board and the third circuit board with the first circuit board disposed on an opposite side of the second circuit board and an opposite side of the third circuit board, and the fifth circuit board is detachably assembled to the fourth circuit board with the second circuit board and the third circuit board disposed on an opposite side of the fourth circuit board.

8. The multi-layer detachable single-axis fiber optic sensing device as claimed in claim 7, wherein the second circuit board and the third circuit board are disposed adjacent to each other.

9. The multi-layer detachable single-axis fiber optic sensing device as claimed in claim 8, wherein an area of the second circuit board is substantially equal to an area of the third circuit board.

10. The multi-layer detachable single-axis fiber optic sensing device as claimed in claim 8, wherein the optical carrier, the first circuit board, the second circuit board, the third circuit board, and the fourth circuit board fully overlap with the fifth circuit board when viewed along a direction perpendicular to the fifth circuit board.

11. The multi-layer detachable single-axis fiber optic sensing device as claimed in claim 1, wherein the first circuit board, the optical carrier, the second circuit board, the third circuit board, the fourth circuit board, and the fifth circuit board are arranged in any order, and any two adjacent of them are detachably assembled to each other using at least one of a plurality of fasteners and a plurality of electrical connectors.

12. The multi-layer detachable single-axis fiber optic sensing device as claimed in claim 1, wherein a normal of the first circuit board, a normal of the second circuit board, a normal of the third circuit board, a normal of the fourth circuit board, and a normal of the fifth circuit board are substantially parallel to each other.

* * * * *